United States Patent
Okerlund et al.

(10) Patent No.: US 7,731,219 B2
(45) Date of Patent: Jun. 8, 2010

(54) TRAILER TONGUE PIVOT HINGE

(75) Inventors: Kawa-She-Quoen Okerlund, Wittenberg, WI (US); Todd Walstrom, Weston, WI (US); Frank Drake, Wausau, WI (US)

(73) Assignee: Cequent Trailer Products, Inc., Mosinee, WI (US)

( * ) Notice: Subject to any disclaimer, the term of this patent is extended or adjusted under 35 U.S.C. 154(b) by 0 days.

(21) Appl. No.: 12/148,860

(22) Filed: Apr. 23, 2008

(65) Prior Publication Data

US 2008/0258431 A1    Oct. 23, 2008

Related U.S. Application Data

(60) Provisional application No. 60/925,784, filed on Apr. 23, 2007.

(51) Int. Cl.
    *B60D 1/54*    (2006.01)
(52) U.S. Cl. .................................. 280/491.3; 280/491.1
(58) Field of Classification Search .............. 280/491.3, 280/491.1
    See application file for complete search history.

(56) References Cited

U.S. PATENT DOCUMENTS

| | | | |
|---|---|---|---|
| 1,949,962 A | 3/1934 | Hess | |
| 2,844,389 A | 7/1958 | Burnett | |
| 2,918,310 A | 12/1959 | Carson | |
| 3,740,078 A | 6/1973 | Murr | |
| 4,073,508 A | 2/1978 | George et al. | |
| 4,398,742 A | 8/1983 | Sanders | |
| 5,011,176 A | 4/1991 | Eppinette | |
| 5,147,095 A | 9/1992 | Duncan | |
| 5,226,657 A | 7/1993 | Dolphin | |
| 5,308,100 A | 5/1994 | Heider et al. | |
| 5,503,423 A | 4/1996 | Roberts et al. | |
| 5,624,129 A | 4/1997 | Clark, Jr. | |
| 5,890,617 A | 4/1999 | Rowland et al. | |
| 5,992,871 A | 11/1999 | Rowland et al. | |
| 6,364,337 B1 * | 4/2002 | Rowland et al. | 280/491.3 |
| 6,460,870 B2 | 10/2002 | Moss | |
| 6,527,292 B2 | 3/2003 | Adair | |
| 6,595,540 B1 | 7/2003 | MacKarvich | |
| 6,648,361 B2 | 11/2003 | Hulsey et al. | |
| D509,776 S | 9/2005 | Stettler | |
| 6,957,826 B1 * | 10/2005 | MacKarvich | 280/491.3 |
| 7,007,967 B2 | 3/2006 | Goettker | |
| 7,021,645 B1 | 4/2006 | Stettler | |
| D543,908 S | 6/2007 | Goettker | |

(Continued)

*Primary Examiner*—Lesley Morris
*Assistant Examiner*—Tashiana Adams
(74) *Attorney, Agent, or Firm*—McDonald Hopkins LLC (57) ABSTRACT

Apparatus, methods, and other embodiments associated with a trailer tongue pivot hinge are described herein. In an embodiment, a pivot assembly for a tongue of a towing trailer includes a trailer arm adapter, a coupler arm adapter, and a pivot member. The trailer arm adapter includes an engagement face positioned at an angle, along with a pivot hinge member and a coupling hinge member extending from the engagement face, where the coupling hinge member is opposed to the pivot hinge member. The coupler arm adapter includes an engagement face positioned at an angle, along with a pivot hinge member and a coupler hinge member extending from the engagement face, where the second coupling hinge member is opposed to the second pivot hinge member. The pivot member is positioned to pivotally engage the trailer arm adapter to the couple arm adapter.

20 Claims, 7 Drawing Sheets

U.S. PATENT DOCUMENTS

| | | |
|---|---|---|
| 7,237,791 B1 * | 7/2007 | Stettler ........................ 280/482 |
| D554,029 S | 10/2007 | Roll et al. |
| 7,410,184 B2 * | 8/2008 | Roll et al. ................. 280/491.3 |
| 7,494,147 B2 * | 2/2009 | Rowland et al. ......... 280/491.3 |
| 7,527,281 B1 * | 5/2009 | Rowland et al. ......... 280/491.1 |
| 2004/0135645 A1 * | 7/2004 | Koyama et al. ............. 331/158 |
| 2005/0218627 A1 | 10/2005 | Rowland |
| 2005/0225053 A1 * | 10/2005 | Roll et al. ................. 280/491.3 |
| 2006/0131836 A1 | 6/2006 | Rowland et al. |
| 2007/0241537 A1 | 10/2007 | Stettler |

\* cited by examiner

TRAILER TONGUE PIVOT HINGE

CROSS-REFERENCE TO RELATED APPLICATIONS

This application claims priority from U.S. Provisional Patent Application No. 60/925,784 entitled "HEAVY DUTY PIVOT HINGE," filed on Apr. 23, 2007, which is hereby incorporated by reference in its entirety.

FIELD OF INVENTION

The present invention relates in general to trailers and, more particularly, to apparatus and methods for selectively adjusting the overall length of a trailer.

BACKGROUND

Large items or objects, such as vehicles, boats, cargo, and the like are often placed onto trailers for transporting from one location to another. Such trailers are commonly coupled to towing vehicles, such as trucks, sport utility vehicles, and the like to transport or tow the items between locations. Once a towed item reaches a destination, the item often remains stored on the trailer until the item is used or again transported. In one common example, recreational boats are generally stored on towing trailers when not in use. In cooler climates, such boats are often removed from lakes and other such bodies of water and stored during the winter months. As most recreational boats are owned by consumers, such boats are typically stored in residential garages when not in use.

It is common for certain types of recreational boats to be at least eighteen feet in length. Once a boat of this length is placed on an appropriate towing trailer, the storage space required to store the boat on the trailer is often larger than can be accommodated by a residential garage. Such a boat loaded onto the trailer may be twenty-four feet long or more, as measured from the most rearward point of the stern of the boat to the most forward portion of the trailer, which is typically the trailer coupler. The average length of a residential garage is less than twenty-four feet. The respective sizes of towing trailers and residential garages makes many garages ineffective as storage locations for trailered boats. With a portion of the trailer extending through the threshold of the garage, the garage door cannot be closed, resulting in exposing the boat to the elements and failing to adequately secure the boat, trailer, and other items stored in the garage.

There is a need for apparatus and methods for reducing the overall length of trailer to accommodate the storage of trailers in certain storage facilities, such as for example residential garages.

SUMMARY OF INVENTION

Apparatus, methods, and other embodiments associated with a trailer tongue pivot hinge are described herein. In an embodiment, a pivot assembly for a tongue of a towing trailer includes a trailer arm adapter, a coupler arm adapter, and a pivot member. The trailer arm adapter includes an engagement face positioned at an angle relative to a longitudinal axis through the trailer arm adapter, along with pivot hinge member and a coupling hinge member extending from the engagement face, where the coupling hinge member is opposed to the pivot hinge member. The coupler arm adapter includes an engagement face positioned at an angle relative to a longitudinal axis through the coupler arm adapter, along with a pivot hinge member and a coupler hinge member extending from the engagement face, where the coupling hinge member is opposed to the pivot hinge member. The pivot member is positioned to engage the pivot hinge members to pivotally engage the trailer arm adapter to the couple arm adapter.

DESCRIPTION OF DRAWINGS

Operation of the invention may be better understood by reference to the following detailed description taken in connection with the following illustrations, wherein.

DETAILED DESCRIPTION OF INVENTION

While the present invention is described with reference to the embodiments described herein, it should be clear that the present invention should not be limited to such embodiments. Therefore, the description of the embodiments herein is illustrative of the present invention and should not limit the scope of the invention as claimed.

Figure 1:
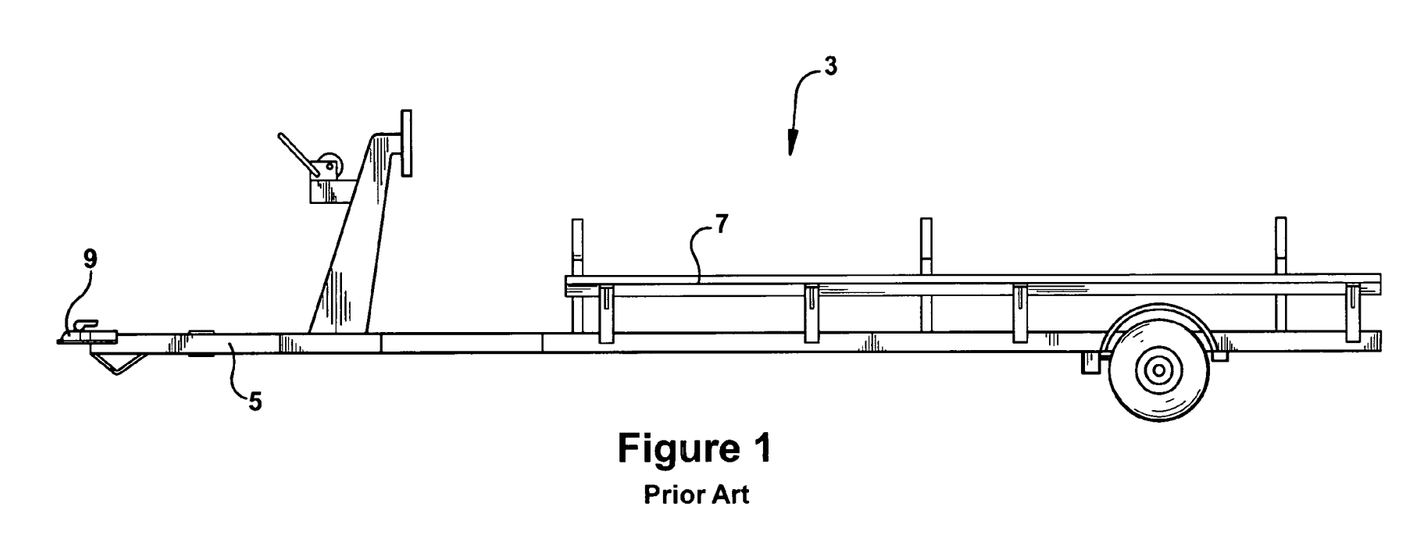
FIG. 1 is a side elevational view of a prior art trailer.

As illustrated in prior art FIG. 1, trailers 3 typically include a tongue or arm 5 extending from a body 7 of the trailer 3. The body 7 is arranged to secure cargo for transport from one location to another. Trailers typically include a coupler mechanism 9 positioned at or near the end of the tongue 5. The coupler 9 is arranged to connect or otherwise attach to a vehicle so that the trailer 3 may be towed. As shown in FIG. 1, the tongue 5 rigidly extends from the body 7, and the overall position and orientation of the tongue 5, with respect to the body 7, is fixed. As arranged in the prior art, the tongue 5 may extend from the body 7 of the trailer 3 such that the overall length of the trailer 3 makes it impossible for a door of a storage facility to be closed when the trailer 3 is parked within the storage facility.

FIGS. 2 through 8 illustrate novel embodiments directed to apparatus and methods of selectively adjusting the overall length of a trailer. The figures show a pivoting assembly 10 that includes a trailer arm adapter 12 and a coupler arm adapter 14. As will be described and shown herein, the pivoting assembly 10 may be attached to, secured to, integrally formed with, or otherwise incorporated into a trailer to facilitate selectively adjusting the overall length of the trailer. Generally, the pivoting assembly 10 is incorporated into a trailer by dividing a tongue of the trailer into a trailer arm 13, leading to the body of the trailer, and a coupler arm 15, with a coupler attached at or near the end of the arm 15. The trailer arm adapter 12 is attached to, secured to, integrally formed with, or otherwise incorporated into the trailer arm 13. The coupler arm adapter 14 is attached to, secured to, integrally formed with, or otherwise incorporated into coupler arm 15. Once the trailer adapter 12 and coupler adapter 14 are incorporated into the trailer, the adapters 12, 14 may be pivotally coupled together to facilitate the adjustment of the overall length of a trailer.

Figure 4:
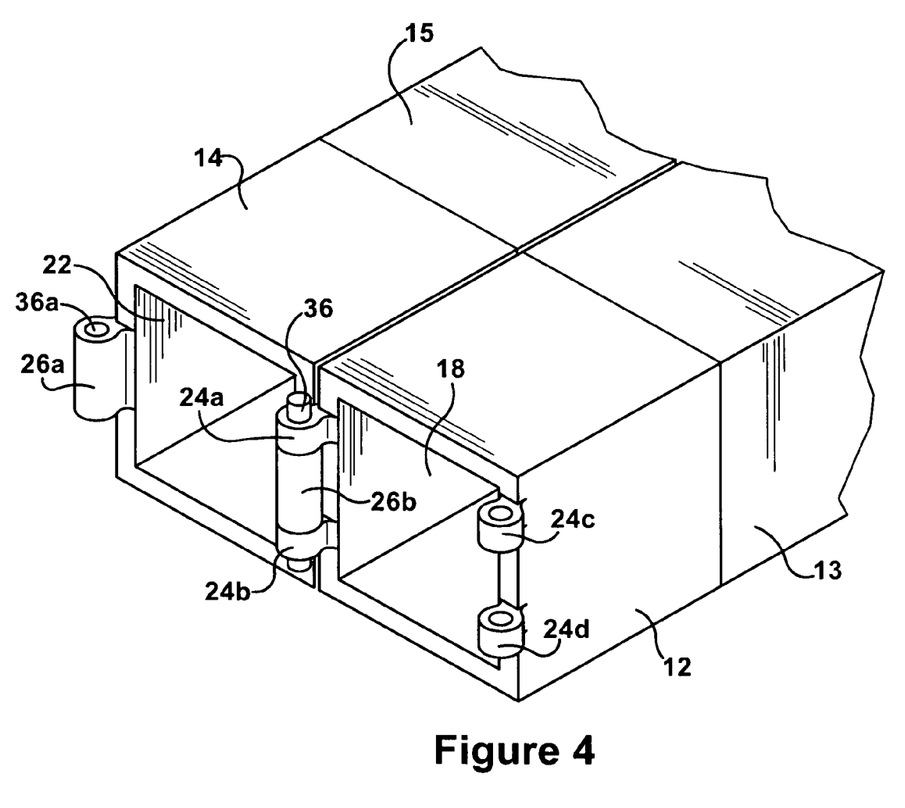
FIG. 4 is a perspective view of a pivoting assembly incorporated into a trailer tongue and positioned in a storage position.

The trailer arm adapter 12 and the coupler arm adapter 14 may be hinged such that the coupler arm adapter 14 moves pivotally with respect to trailer arm adapter 12. Such pivotal movement allows the coupler arm 15 to fold back towards the trailer arm 13, thus reducing the overall length of the trailer. In an embodiment, as best illustrated by FIG. 4, the coupler arm 15 folds back to a position generally parallel to the trailer arm 13. The reduction in overall length of the trailer enables the trailer to be parked in smaller storage facility than would otherwise be practical.

Generally the tongue may be divided into a trailer arm 13 and a coupler arm 15 through any number of methods. In an embodiment, a prior art trailer may be retrofit to include a pivoting assembly 10 by cutting or severing the tongue at any point along the tongue to form a trailer arm 13 from the tongue portion remaining with the trailer and a coupler portion 15 from the portion of the tongue severed from the trailer. The pivoting assembly 10 may then be incorporated at the location of the cut. In another embodiment, the tongue may be manufactured to be shorter than current designs and a second arm may be manufactured containing a coupler. In such an arrangement, a pivoting assembly 10 may be inserted between the shortened tongue and the coupler arm to form a pivotable tongue extending from the trailer. In yet another embodiment the tongue may be manufactured with the pivoting assembly 10 integrally formed with the tongue. The embodiments described are exemplary only and other methods of incorporating a pivoting assembly 10 into a trailer will be readily understood by those skilled in the art upon reading and understanding this detailed description.

Figure 2:
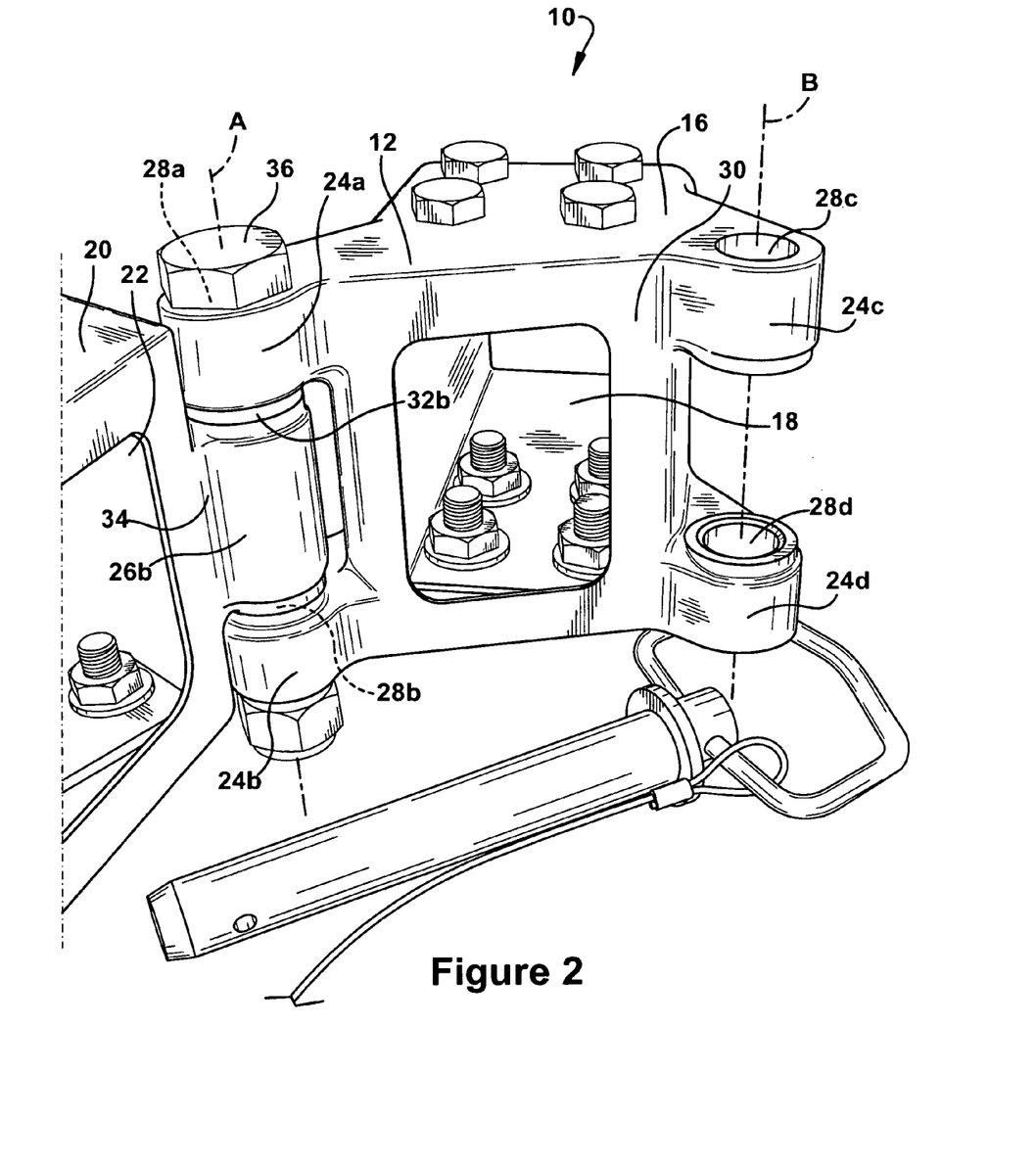
FIG. 2 is a partial perspective view of a trailer arm adapter pivotally connected to a coupler arm adapter.

As shown in FIG. 2, the trailer arm adapter 12 may have a generally tubular construction, with a square exterior surface 16 and a generally square passage or chamber 18 passing through the adapter 12. The coupler arm adapter 14 may include a similar construction, with a generally square exterior surface 20 and a generally square passage or chamber 22 passing through the adapter 14. In one embodiment, the adapters 12, 14 may be manufactured or fabricated from heavy duty steel through any known process, such as forging, milling, stamping, molding, sintering, and the like.

Once incorporated into a trailer, the adapters 12, 14 may be pivotally attached to facilitate pivotal movement of one adapter with respect to the other adapter. Hinge members 24, 26 extending from the adapters 12, 14 may facilitate the pivotal attachment. As best seen in FIG. 2, the trailer arm adapter 12 includes four hinge members 24a, 24b, 24c, 24d. Each hinge member 24a, 24b, 24c, 24d extends from the body of the adapter 12 and includes an aperture or bore 28a, 28b, 28c, 28d passing therethrough. As shown, the hinge members 24a, 24b, 24c, 24d generally extend from the four corners of a surface 30 of the adapter 12. The bores 28a, 28b of a first pair of hinge members 24a, 24b align along a generally vertical axis A, and the bores 28c, 28d of a second pair of hinge members 24c, 24d align along a second generally vertical axis B. In another embodiment, the trailer arm adapter 12 may include only two hinge members 24 extending from opposing sides of the adapter 12.

The pivotal attachment is further facilitated by hinge members 26a, 26b, which extends from the body of the coupler arm adapter 14. As best seen in FIG. 4, the coupler arm adapter 14 includes two hinge members 26a, 26b. Each hinge member 26a, 26b generally extends from a midpoint the body of the adapter 14 and includes an aperture or bore 32a, 32b passing therethrough. As shown, the hinge members 26a, 26b are opposed to one another and extend from a surface 34 of the coupler arm adapter 14 that is arranged to mate or engage with a surface 30 of the trailer arm adapter 12.

As best seen in FIG. 2, a hinge member 26b of the coupler arm adapter 14 may be positioned such that its bore 32b aligns with the bores 28a, 28b of the first pair of hinge members 24a, 24b extending from the trailer arm adapter 12. In such an arrangement, the bores 28a, 28b, 32b are aligned along the axis A and a pivot pin 36 may be inserted or passed through the bores 28a, 28b, 32b to pivotably connect the trailer arm adapter 12 and the coupler arm adapter 14. Such an arrangement allows the coupler arm adapter 14 to rotate relative to the trailer arm adapter 12.

Figure 3:
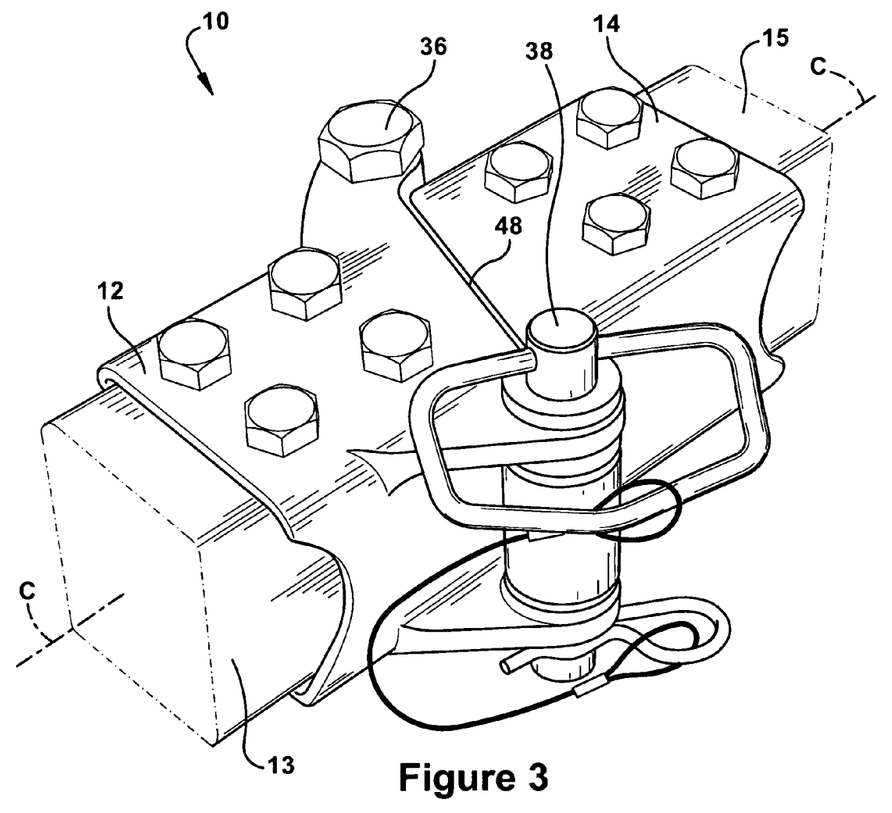
FIG. 3 is a perspective view of a pivoting assembly incorporated into a trailer tongue and positioned in a towing position.

It will be readily understood by those skilled in the art that once the adapters 12, 14 are incorporated into a tongue of a trailer and pivotally connected, the coupler arm 15 is capable of rotating between a towing position, where the trailer arm 13 and coupler arm 15 are aligned along a common axis C (as seen in FIG. 3), and a storage position, where the coupler arm 15 is rotated approximately 180 degrees from the towing position and positioned along side the trailer arm 13 (as seen in FIG. 4).

Referring to FIG. 3, when the tongue is in the towing position, a hinge member 26a of the coupler arm adapter 14 is positioned such that its bore 32a aligns with the bores 28c, 28d of the second pair of hinge members 24c, 24d extending from the trailer arm adapter 12. In such an arrangement, the bores 28c, 28d, 32a are aligned along the axis B and a securing pin 38 may be passed through the bores 28c, 28d, 32a to secure the tongue in the towing position and preventing the coupler arm adapter 14 from rotate relative to the trailer arm adapter 12. In such an arrangement, the trailer arm 13 and the coupler arm 15 are secured such that the arms 13, 15 are aligned along a common axis C, and the arms 13, 15 are secured to function as a rigid tongue, by which the trailer may be towed.

Figure 5:
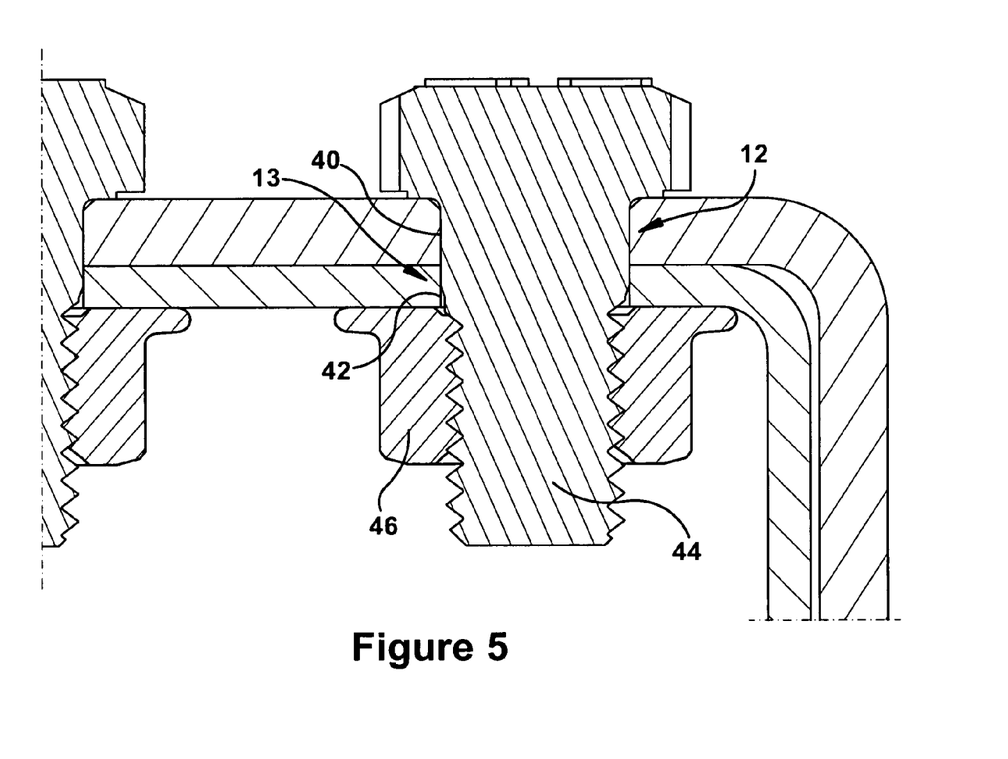
FIG. 5 is a schematic cross-sectional view of an trailer arm adapter fastened to a trailer tongue.

As described above, the adapters 12, 14 may be incorporated into the tongue in a number of ways. In one embodiment, each adapter 12, 14 includes a plurality of apertures 40 designed to accept bolts, pins, screws, rivets, or other such fasteners. The adaptors 12, 14 may be arranged to fit over the arms 13, 15 such that the adapters 12, 14 fit snuggly on all four sides of the arms 13, 15. As will be readily understood by those skilled in the art, the trailer arm 13 and coupler arm 15 may be manufactured, fabricated, or retrofitted with a matching plurality of apertures 42 to accept any bolts, pins, screws, rivets, or other such fasteners passed through the apertures 40 in the adapters. Once such fasteners are fastened in the matching apertures 42, the adapter 12, 14 may be secured to the respective arm 13, 15. In an embodiment, the adaptors 12, 14 may be reversibly coupled to the arms 13, 15 by a bolt 44 and nut 46 fastener system, as seen in FIG. 5. In another embodiment, the adapters 12, 14 may be nonreversibly secured to the arms 13, 15 by a punched rivet fastening system.

Figure 6:
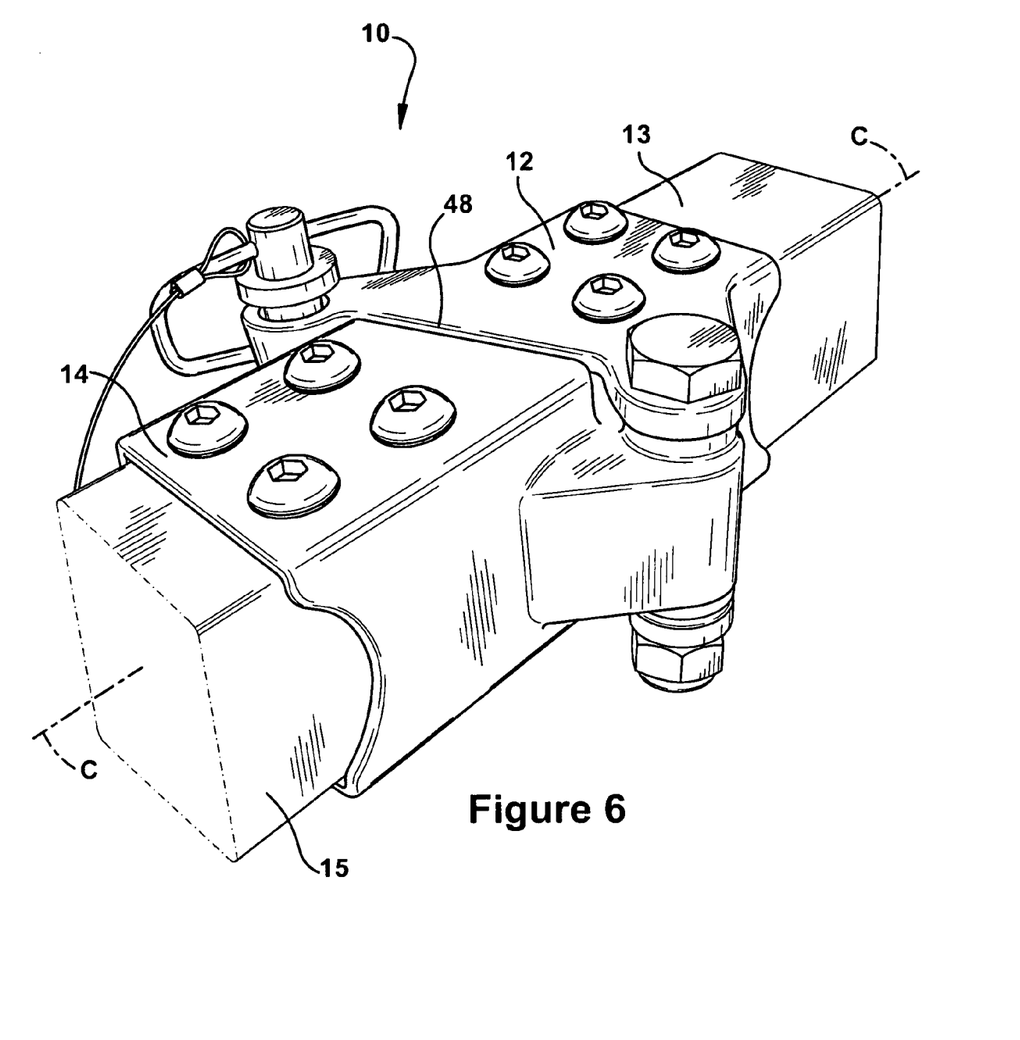
FIG. 6 is a perspective view of a pivoting assembly incorporated into a trailer tongue and positioned in a towing position.
Figures 7, 8:
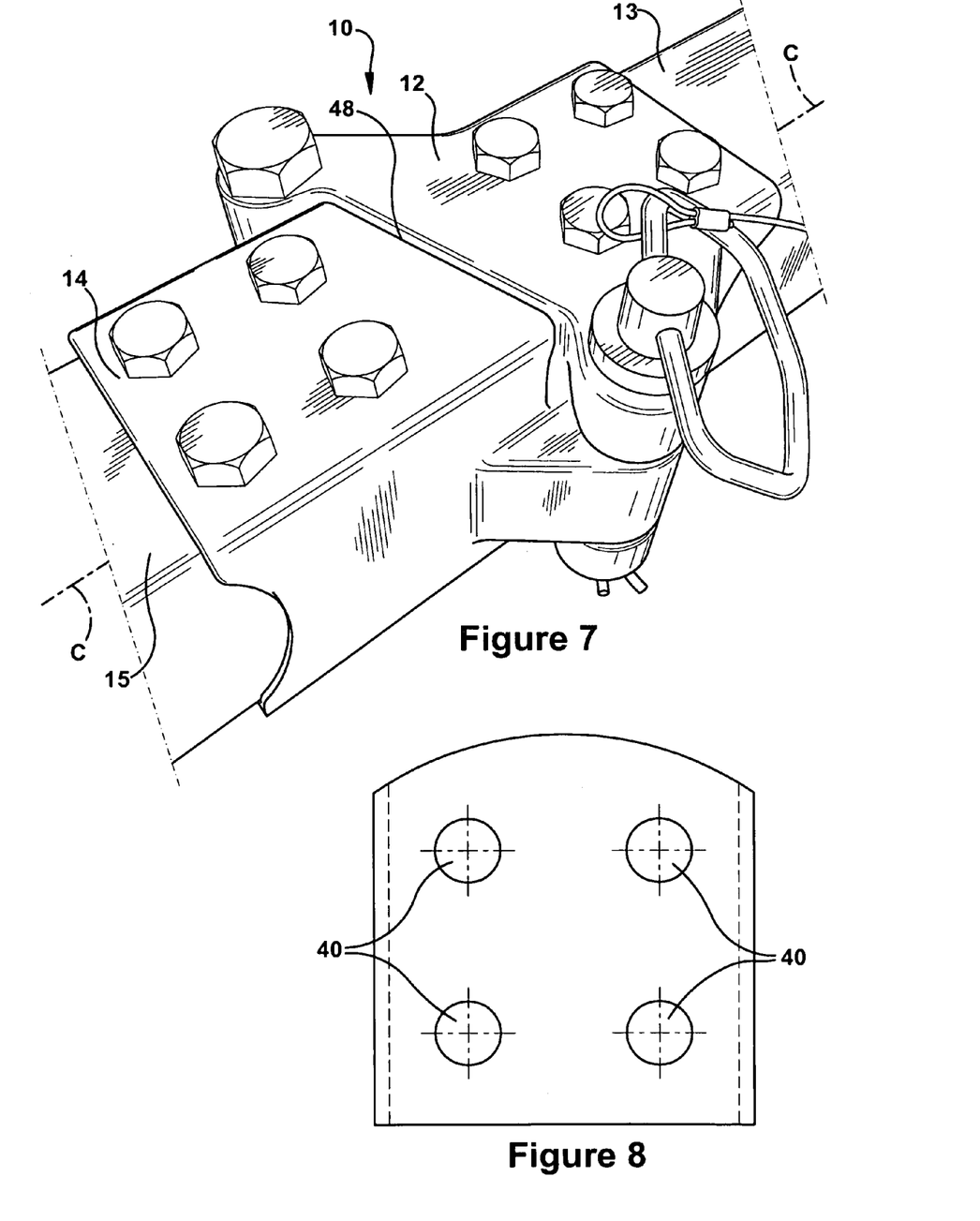
FIG. 7 is a perspective view of a pivoting assembly incorporated into a trailer tongue and positioned in a towing position.
FIG. 8 is a top view of a fastener aperture pattern for a pivot assembly.

An embodiment of an aperture 40 pattern is illustrated in FIG. 8. As seen in FIGS. 3, 6, and 7, the apertures 40 and fasteners are preferably positioned in the top and bottom of the adapters 12, 14 and arms 13, 15. In such an arrangement the fasteners do not interfere with the arms 13, 15 when the tongue is in the stored position, as seen in FIG. 4.

In another embodiment, the adaptors 12, 14 are arranged to fit over the arms 13, 15 such that the adapters 12, 14 fit snuggly on all four sides of the arms 13, 15. Once situated as such, the adaptors 12, 14 may be secured to the arms 13, 15 by a welding process. The adaptors 12, 14 may optionally include flanges (not shown) to facilitate the welding process.

In an embodiment, the adapters 12, 14 are arranged such that they mate or engage along engagement faces or surfaces 30, 34 to form an interface 48 that is positioned at an angle with respect to a longitudinal axis passing through the arms 13, 15 or adapters 12, 14. As illustrated in FIG. 6, the adaptors 12, 14 mate along such an interface 48 when the arms 13, 15 are positioned in the towing position and aligned along the Axis C. In such an arrangement, the interface 48 is angled with respect to the axis C. Such an arrangement effectively distributes the load of towing the trailer and avoids concentrations of stress or force while the trailer is being towed.

The invention has been described above and, obviously, modifications and alternations will occur to others upon the reading and understanding of this specification. The claims as follows are intended to include all modifications and alterations insofar as they come within the scope of the claims or the equivalent thereof.

We claim:

1. A pivot assembly for a tongue of a towing trailer, the assembly comprising:
    a trailer arm adapter comprising:
        a first engagement face positioned at an angle other than perpendicular relative to a longitudinal axis through the trailer arm adapter;
        a first pivot hinge member extending from the first engagement face; and
        a first coupling hinge member extending from the first engagement face and opposed to the first pivot hinge member;
    a coupler arm adapter comprising:
        a second engagement face positioned at an angle other than perpendicular relative to the longitudinal axis through the coupler arm adapter;
        a second pivot hinge member extending from the second engagement face; and
        a second coupling hinge member extending from the second engagement face and opposed to the second pivot hinge member; and
    a pivot member selectively positionable to engage the first pivot hinge member and the second pivot hinge member to pivotally engage the trailer arm adapter to the couple arm adapter.

2. The pivot assembly of claim 1, further comprising a coupling member selectively positionable to engage the first coupling hinge member and the second coupling hinge member to rigidly couple the trailer arm adapter to the couple arm adapter when the pivot member is engaged.

3. The pivot assembly of claim 2, where the first engagement face abuts the second engagement face when the pivot member is engaged and the coupling member is engaged.

4. The pivot assembly of claim 1, further comprising:
    a first passage through the trailer arm adapter; and
    a second passage through the coupler arm adapter.

5. The pivot assembly of claim 4, where the first passage is sized to selectively engage a trailer arm of the tongue, and the second passage is sized to selectively engage a coupler arm of the tongue.

6. The pivot assembly of claim 5, where the first passage is generally square is shape and the second passage is generally square in shape.

7. The pivot assembly of claim 5, further comprising:
    at least one aperture through the trailer arm adapter sized to accept a fastener to secure the trailer arm adapter to the trailer arm; and
    at least one aperture through the coupler arm adapter sized to accept a fastener to secure the coupler arm adapter to the coupler arm.

8. The pivot assembly of claim 5, further comprising:
    a first flange extending from the trailer arm adapter positioned to selectively secure the trailer arm adaptor to the trailer arm through welding of the first flange to the trailer arm; and
    a second flange extending from the coupler arm adapter positioned to selectively secure the coupler arm adaptor to the coupler arm through welding of the second flange to the coupler arm.

9. A pivoting assembly for a towing trailer comprising:
    a trailer arm adapter comprising:
        a trailer arm adapter body;
        a trailer arm adapter chamber through the trailer arm adapter body sized to selectively receive a trailer arm of the towing trailer;
        a first engagement surface positioned at an angle other than perpendicular relative to a longitudinal axis through the trailer arm adapter chamber;
        a first hinge member extending from a first side of the trailer arm adapter body; and
        a second hinge member extending from a second side of the trailer arm adapter body;
    a coupler arm adapter comprising:
        a coupler arm adapter body;
        a coupler arm adapter chamber through the coupler adapter body sized to selectively receive a coupler arm of the towing trailer;
        a third hinge member extending from a first side of the coupler arm adapter body; and
        a fourth hinge member extending from a second side of the coupler arm adapter body; and
    a first connecting member selectively positionable to couple the first hinge member and the third hinge member to pivotally connect the trailer arm adapter to the couple arm adapter.

10. The pivoting assembly of claim 9, further comprising a second connecting member selectively positionable to couple the second hinge member and the fourth hinge member to rigidly secure the trailer arm adapter to the couple arm adapter when the first connecting member is engaged.

11. The pivoting assembly of claim 10, further comprising:
    a first bore through the first hinge member;
    a second bore through the second hinge member;
    a third bore through the third hinge member; and
    a fourth bore through the fourth hinge member;
    wherein the first connecting member is a pivot pin that passes through the first bore and the third bore, and the second connecting member is a pin that passes through the second bore and the fourth bore.

12. The pivoting assembly of claim 9, where the first chamber is generally square in shape and the second passage is generally square in shape.

13. The pivoting assembly of claim 9, further comprising:
    at least one aperture through the trailer arm adapter body sized to accept a fastener to secure the trailer arm adapter to the trailer arm; and
    at least one aperture through the coupler arm adapter body sized to accept a fastener to secure the coupler arm adapter to the coupler arm.

14. The pivoting assembly of claim 9, further comprising:
    a first flange extending from the trailer arm body positioned to selectively secure the trailer arm adaptor to the trailer arm through welding of the first flange to the trailer arm; and a second flange extending from the coupler arm body positioned to selectively secure the coupler arm adaptor to the coupler arm through welding of the second flange to the coupler arm.

15. The pivoting assembly of claim 9, where the coupler arm is positionable between a towing position where the coupler arm and the trailer arm are generally aligned along a common longitudinal axis, and a storage position, where the coupler arm and the trailer arm are not aligned along a common longitudinal axis.

16. A method of adjusting the length of a tongue of a towing trailer comprising:
   securing a trailer arm adapter to a trailer arm of the tongue, the trailer arm adapter comprising a first angled engagement surface positioned at an angle other than perpendicular relative to a longitudinal axis, a first hinge member extending from a first side of the trailer arm adapter, and a second hinge member extending from a second side of the trailer arm adapter;
   securing a coupler arm adapter to a coupler arm of the tongue, the coupler adapter comprising a second angled engagement surface positioned at an angle other than perpendicular relative to the longitudinal axis, a third hinge member extending from a first side of the coupler arm adapter, and a second hinge member extending from a second side of the coupler arm adapter;
   positioning a pivoting member to engage the first hinge member and the third hinge member to pivotally connect the trailer arm adapter to the couple arm adapter; and
   rotating the coupler arm adapter about the pivot member.

17. The method of claim 16, further comprising:
   positioning the coupler arm generally along a common axis with the trailer arm; and
   positioning a securing member to engage the second hinge member and the fourth hinge member to rigidly connect the trailer arm adapter to the couple arm adapter.

18. The method of claim 16, further comprising:
   positioning fasteners through the trailer arm adapter and the trailer arm to secure the trailer arm adapter to the trailer arm; and
   positioning fasteners through the coupler arm adapter and the coupler arm to secure the coupler arm adapter to the coupler arm.

19. The method of claim 16, further comprising severing the tongue of the towing trailer to form the coupler arm from the section of the tongue severed and to form the trailer arm from the remainder of the tongue extending from the towing trailer.

20. The method of claim 16, further comprising:
   manufacturing the trailer arm integrally with the towing trailer; and
   manufacturing the coupler arm as a separate member from the towing trailer.

\* \* \* \* \*